United States Patent
Sun et al.

(10) Patent No.: US 12,347,295 B2
(45) Date of Patent: Jul. 1, 2025

(54) METHOD AND DEVICE FOR SMOKE OR FIRE RECOGNITION, COMPUTER APPARATUS, AND STORAGE MEDIUM

(71) Applicant: CSG POWER GENERATION CO., LTD., Guangzhou (CN)

(72) Inventors: Liqun Sun, Guangzhou (CN); Man Chen, Guangzhou (CN); Hao Zhang, Guangzhou (CN); Yong Lu, Guangzhou (CN); Tao Liu, Guangzhou (CN); Ming Xu, Guangzhou (CN); Jianhui Li, Guangzhou (CN); Miaogeng Wang, Guangzhou (CN); Zhipeng Lv, Guangzhou (CN); Kai Lin, Guangzhou (CN); Yulin Han, Guangzhou (CN); Yu Gong, Guangzhou (CN); Haifeng Guo, Guangzhou (CN); Xiaoyi Wang, Guangzhou (CN); Hanlong Wang, Guangzhou (CN); Rufei He, Guangzhou (CN)

(73) Assignee: CSG POWER GENERATION CO., LTD., Guangzhou (CN)

( * ) Notice: Subject to any disclaimer, the term of this patent is extended or adjusted under 35 U.S.C. 154(b) by 172 days.

(21) Appl. No.: 17/919,511

(22) PCT Filed: Mar. 5, 2021

(86) PCT No.: PCT/CN2021/079267
§ 371 (c)(1),
(2) Date: Aug. 25, 2023

(87) PCT Pub. No.: WO2022/121129
PCT Pub. Date: Jun. 16, 2022

(65) Prior Publication Data
US 2024/0005757 A1   Jan. 4, 2024

(30) Foreign Application Priority Data

Dec. 12, 2020   (CN) .......................... 202011453646.7

(51) Int. Cl.
*G08B 17/12* (2006.01)
*G06V 10/25* (2022.01)
(Continued)

(52) U.S. Cl.
CPC .......... *G08B 17/125* (2013.01); *G06V 10/25* (2022.01); *G06V 10/56* (2022.01); *G06V 10/60* (2022.01); *G06V 10/82* (2022.01); *G06V 20/52* (2022.01)

(58) Field of Classification Search
None
See application file for complete search history.

(56) References Cited

U.S. PATENT DOCUMENTS

| 2009/0123074 A1 | 5/2009 | Chen | |
| 2018/0218504 A1* | 8/2018 | Makino | .................. G06T 7/215 |
| 2021/0049789 A1* | 2/2021 | Bonn | .................... G06V 20/52 |

FOREIGN PATENT DOCUMENTS

| CN | 101814134 A | 8/2010 |
| CN | 102163358 A | 8/2011 |

(Continued)

OTHER PUBLICATIONS

International Search Report for corresponding Application No. PCT/CN2021/079267 dated Sep. 13, 2021, 4 pages.
Written Opinion for corresponding Application No. PCT/CN2021/079267 dated Sep. 13, 2021, 3 pages.
(Continued)

*Primary Examiner* — Hung Q Dang
(74) *Attorney, Agent, or Firm* — Taft Stettinius & Hollister LLP

(57) ABSTRACT

A method and device for smoke or fire recognition, a computer device and a storage medium are disclosed. The method includes: acquiring a to-be-recognized image in a
(Continued)

smoke or fire monitoring region; recognizing a smoke or fire suspected region in the to-be-recognized image according to the to-be-recognized image, including recognizing a smoke or fire suspected region in a visible light image on the basis of colors, and recognizing a smoke or fire suspected region in an infrared image on the basis of brightness; and inputting the to-be-recognized image including the smoke or fire suspected region into a preset model, and recognizing a smoke or fire state in the to-be-recognized image according to an output result of the preset model, the preset model being obtained by training based on the visible light image pre-marked with a smoke or fire state or the infrared image pre-marked with a smoke or fire state.

6 Claims, 6 Drawing Sheets

(51) Int. Cl.
*G06V 10/56* (2022.01)
*G06V 10/60* (2022.01)
*G06V 10/82* (2022.01)
*G06V 20/52* (2022.01)

(56) References Cited

FOREIGN PATENT DOCUMENTS

| CN | 102236947 | A |   | 11/2011 |             |
|----|-----------|---|---|---------|-------------|
| CN | 104581076 | A |   | 4/2015  |             |
| CN | 105046218 | A | * | 11/2015 | G06K 9/00711 |
| CN | 105488941 | A |   | 4/2016  |             |
| CN | 105512667 | A |   | 4/2016  |             |
| CN | 107730548 | A |   | 2/2018  |             |
| CN | 108090495 | A |   | 5/2018  |             |
| CN | 108108695 | A |   | 6/2018  |             |
| CN | 109637068 | A |   | 4/2019  |             |
| CN | 110598655 | A |   | 12/2019 |             |
| CN | 111476086 | A |   | 7/2020  |             |
| CN | 111626188 | A |   | 9/2020  |             |

OTHER PUBLICATIONS

International Search Authority for corresponding Application No. PCT/CN2021/079267 dated Sep. 13, 2021, 1 page.
Chinese Office Action for corresponding Application No. 202011453646.7 dated Nov. 30, 2022, 8 pages.
Lin, Rui, "Research on Video Flame Detection System Based on Multi-Sensor," CNKI Master's Electronic Journal (Engineering Science and Technology II), Sep. 15, 2019, Chapter 4-5, Drawings 5.1-5.3.

* cited by examiner

METHOD AND DEVICE FOR SMOKE OR FIRE RECOGNITION, COMPUTER APPARATUS, AND STORAGE MEDIUM

CROSS REFERENCE TO RELATED APPLICATIONS

This is a U.S. National Stage application of, and claims priority to, PCT/CN2021/079267, filed Mar. 5, 2021, which further claims priority to Chinese Patent Application No. 202011453646.7, filed Dec. 12, 2020, the disclosures of which are incorporated herein by reference in their entirety.

TECHNICAL FIELD

The present disclosure relates to the field of safety early-warning technologies, and in particular, to a method and device for smoke or fire recognition, a computer apparatus, and a storage medium.

BACKGROUND

Emergence of fire has promoted the progress of human civilization, but a fire disaster has always been a major threat and calamity all over the world. For example, in a power plant, regions of influence and severity of a fire accident include: property losses, casualties, interruption of normal power generation, etc., based on a reason that once a fire disaster occurs, power generation equipment and power transformation and distribution equipment may generally be burnt down, and it generally takes a long time to repair or replace such equipment, which affects production of the power plant, and more seriously, causes power failure of other enterprises and departments, thereby leading to serious accidents and losses. Secondly, the fire accident may cause casualties of workers in the power plant. In addition, the fire accident may sometimes cause some chaos in public places and occurrence of criminal cases, resulting in adverse consequences and influence. How to prevent and recognize a fire disaster early is one of the important means to reduce serious harm caused by occurrence and spread of the fire disaster, so timely and accurate early warning of the fire disaster becomes particularly important.

At present, smoke or fire detection in a fire disaster is generally performed based on heat detection or smoke detection. However, when smoke or fire is detected by means of heat detection or smoke detection, the smoke or fire can be detected only after the concentration of the smoke reaching a certain degree, by which time the fire is generally widespread.

Therefore, the current method for smoke or fire recognition has a defect of belated detection.

SUMMARY

Based on the above, there is a need to provide a method and device for smoke or fire recognition, a computer apparatus, and a storage medium that can recognize smoke or fire in time with respect to the above technical problem.

A method for smoke or fire recognition is provided, including:
  acquiring a to-be-recognized image in a smoke or fire monitoring region, the to-be-recognized image including a visible light image and/or an infrared image;
  recognizing a smoke or fire suspected region in the to-be-recognized image according to the to-be-recognized image, including: recognizing a smoke or fire suspected region in the visible light image based on colors, and recognizing a smoke or fire suspected region in the infrared image based on brightness; and
  inputting the to-be-recognized image including the smoke or fire suspected region into a preset model, and recognizing a smoke or fire state in the to-be-recognized image according to an output result of the preset model, the preset model being obtained by training based on the visible light image pre-marked with a smoke or fire state or the infrared image pre-marked with a smoke or fire state.

In one embodiment, the acquiring the to-be-recognized image in the smoke or fire monitoring region includes:
  acquiring a monitoring image in the smoke or fire monitoring region;
  filtering the monitoring image correspondingly according to an image type of the monitoring image to obtain a filtered monitoring image; and
  eliminating a device motion optical flow in the filtered monitoring image according to multiple frames of the filtered monitoring image to obtain the to-be-recognized image.

In one embodiment, the filtering the monitoring image correspondingly according to the image type of the monitoring image to obtain the filtered monitoring image includes:
  acquiring, if the monitoring image is the visible light image, color values of pixels in the visible light image in color channels of a trichromatic color space;
  acquiring a ratio of each color value to a sum of all the color values;
  acquiring products of the color value having a maximum ratio and the ratios as normalized color values corresponding to the color values;
  determining hue values, saturation values, and tone values corresponding to the pixels according to a maximum value and a minimum value of the normalized color values and the color values corresponding to the pixels;
  obtaining luminance values, chrominance values, and concentration values corresponding to the pixels according to the normalized color values and a preset brightness-chrominance transformation matrix; and
  obtaining the filtered monitoring image according to the color values, the hue values, the saturation values, the tone values, the luminance values, the chrominance values, and the concentration values corresponding to the pixels in the monitoring image;
  and/or
  sorting, if the monitoring image is an infrared image, all pixels in a neighborhood of each pixel in the infrared image, acquiring an intermediate grayscale value in the sorted pixels, and assigning the intermediate grayscale value to the corresponding pixel to obtain the filtered monitoring image.

In one embodiment, the eliminating the device motion optical flow in the filtered monitoring image according to the multiple frames of the filtered monitoring image to obtain the to-be-recognized image includes:
  obtaining a projection transformation matrix corresponding to the filtered monitoring image according to a filtered monitoring image at a current moment and a filtered monitoring image at a next moment corresponding to the current moment; and
  obtaining, according to an inverse of the projection transformation matrix and the filtered monitoring image corresponding to the current moment, a filtered monitoring image after elimination of the device motion optical flow as the to-be-recognized image.

In one embodiment, the recognizing a smoke or fire suspected region in the to-be-recognized image according to the to-be-recognized image includes:

obtaining, if the to-be-recognized image is the visible light image, a minimum smoke region in the to-be-recognized image according to the brightness values, the chrominance values, the concentration values, the color values, a first maximum threshold, and a first minimum threshold corresponding to pixels in the to-be-recognized image;

obtaining a first minimum flame region in the to-be-recognized image according to a first color threshold, a second color threshold, and the color values corresponding to the pixels in the to-be-recognized image;

obtaining a second minimum flame region in the to-be-recognized image according to the hue values, the saturation values, and the tone values corresponding to the pixels in the to-be-recognized image;

obtaining a third minimum flame region in the to-be-recognized image according to the luminance values, the chrominance values, the concentration values, a luminance threshold, a brightness threshold, and a chrominance threshold corresponding to the pixels in the to-be-recognized image;

extracting an optical flow from an image sequence of a plurality of to-be-recognized images to obtain a motion region in the to-be-recognized image; and obtaining the smoke or fire suspected region in the to-be-recognized image according to the minimum smoke region, the first minimum flame region, the second minimum flame region, the third minimum flame region, and the motion region;

and/or obtaining, if the to-be-recognized image is the infrared image, a flame region in the to-be-recognized image according to a preset infrared brightness threshold;

obtaining a pixel difference corresponding to the to-be-recognized image according to a to-be-recognized image at a current moment and a to-be-recognized image at a next moment corresponding to the current moment;

determining a motion region in the to-be-recognized image according to the pixel difference and a preset motion image threshold; and obtaining the smoke or fire suspected region in the to-be-recognized image according to the flame region and the motion region.

In one embodiment, the preset model includes: a first preset model and a second preset model.

The inputting the to-be-recognized image including the smoke or fire suspected region into the preset model, and recognizing the smoke or fire state in the to-be-recognized image according to an output result of the preset model includes:

inputting the to-be-recognized image into the first preset model if the to-be-recognized image is the visible light image;

inputting the to-be-recognized image into the second preset model if the to-be-recognized image is the infrared image;

acquiring a judgment vector obtained after feature extraction on the smoke or fire suspected region through the first preset model and/or the second preset model; and determining the smoke or fire state in the to-be-recognized image according to the judgment vector.

In one embodiment, subsequent to the recognizing the smoke or fire state in the to-be-recognized image according to the output result of the preset model, the method further includes:

triggering, if the smoke or fire state is smoke or fire, alarm information, and inputting the to-be-recognized image into a smoke or fire detection model to acquire a smoke or fire region prediction box outputted by the smoke or fire detection model, the smoke or fire detection model being obtained by training based on a plurality of images with smoke or fire; and continuously recognizing the smoke or fire region prediction box according to a preset discriminant tracking algorithm, in order to track the smoke and smoke or fire state in the to-be-recognized image, a smoke or fire region prediction box in the to-be-recognized image at a current moment being obtained through the preset discriminant tracking algorithm based on a to-be-recognized image including a smoke or fire region prediction box at a previous moment corresponding to the current moment.

A device for smoke or fire recognition is also provided, including:

an acquisition module configured to acquire a to-be-recognized image in a smoke or fire monitoring region, the to-be-recognized image including a visible light image and/or an infrared image;

a first recognition module configured to recognize a smoke or fire suspected region in the to-be-recognized image according to the to-be-recognized image, including: recognizing a smoke or fire suspected region in the visible light image based on colors, and recognizing a smoke or fire suspected region in the infrared image based on brightness; and a second recognition module configured to input the to-be-recognized image including the smoke or fire suspected region into a preset model, and recognize a smoke or fire state in the to-be-recognized image according to an output result of the preset model, the preset model being obtained by training based on the visible light image pre-marked with a smoke or fire state or the infrared image pre-marked with a smoke or fire state.

A computer program, including a memory and a processor. The memory stores a computer program, and the processor implements steps of the above method when executing the computer program.

A computer-readable storage medium, storing a computer program. The computer program, when executed by a processor, causes the processor to implement steps of the method.

According to the method and device for smoke or fire recognition, the computer apparatus, and the storage medium, a to-be-recognized image including a visible light image and an infrared image in a fire monitoring region is acquired, a smoke or fire suspected region in the to-be-recognized image is recognized according to the to-be-recognized image, including: recognizing a smoke or fire suspected region in the visible light image based on colors, and recognizing a smoke or fire suspected region in the infrared image based on brightness, then the to-be-recognized image including the smoke or fire suspected region is inputted into a preset model, and a smoke or fire state in the to-be-recognized image is recognized according to an output result of the preset model obtained by training based on the visible light image pre-marked with a smoke or fire state or the infrared image pre-marked with a smoke or fire state.

Compared with a conventional manner for detecting smoke or fire based on heat detection or smoke detection, in the solution according to the present disclosure, the smoke or fire region in the visible light image or the infrared image is recognized by the preset model, so as to achieve an effect of improving timeliness of smoke or fire recognition.

DETAILED DESCRIPTION OF THE EMBODIMENTS

In order to make the objectives, technical solutions, and advantages of the present disclosure clearer, the present disclosure is described in further detail below with reference to the accompanying drawings and embodiments. It is to be understood that specific embodiments described herein are intended only to explain the present disclosure and not to limit the present disclosure.

Figure 1:
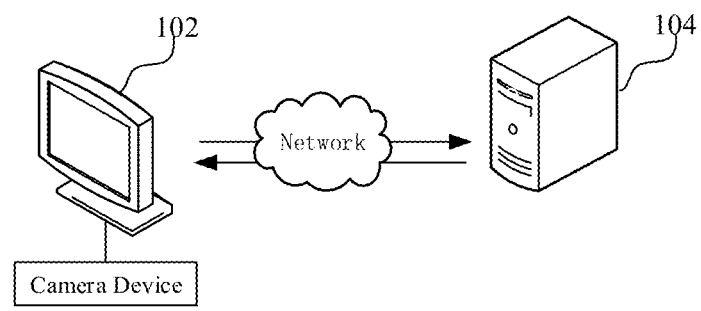
FIG. 1 is a schematic diagram illustrating an application environment of a method for smoke or fire recognition according to an embodiment.

A method for smoke or fire recognition according to the present disclosure is applicable to an application environment shown in FIG. 1. A terminal 102 communicates with a server 104 over a network. The terminal 102 may acquire a to-be-recognized image in a smoke or fire monitoring region, which may be acquired by, for example, a camera device connected to the terminal 102. The camera device may be a mobile camera device or a fixed camera device. The terminal 102 may recognize a smoke or fire suspected region in the to-be-recognized image according to the to-be-recognized image. After recognizing the smoke or fire suspected region, the terminal 102 may further use a trained preset model to input the to-be-recognized image into the preset model, and recognize a smoke or fire state in the to-be-recognized image according to an output result of the preset model. After obtaining the smoke or fire state, the terminal 102 may make a corresponding prompt according to the smoke or fire state, and may further send the smoke or fire state to the server 104. The server 104 may store a recognition result. The terminal 102 may be, but is not limited to, a variety of personal computers, laptop computers, smart phones, and tablet computers. The server 104 may be implemented using a standalone server or a cluster of a plurality of servers.

Figure 2:
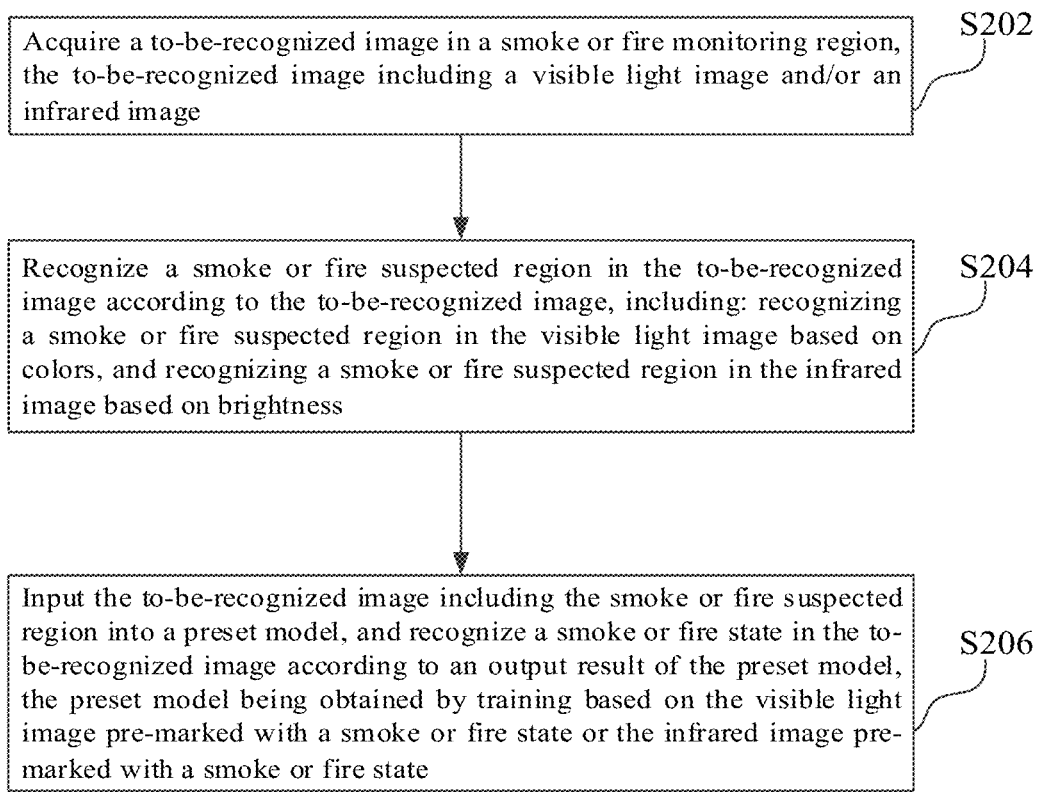
FIG. 2 is a schematic flow diagram illustrating the method for smoke or fire recognition according to an embodiment.

In one embodiment, as shown in FIG. 2, a method for smoke or fire recognition is provided. For example, the method is applied to the terminal shown in FIG. 1, and includes the following steps.

In step S202, a to-be-recognized image in a smoke or fire monitoring region is acquired, the to-be-recognized image including a visible light image and/or an infrared image.

The smoke or fire monitoring region may be a range that can be captured by the camera device connected to the terminal 102. The terminal 102 may acquire the to-be-recognized image in the smoke or fire monitoring region. The to-be-recognized image may include a plurality of types. For example, the to-be-recognized image may include a visible light image or an infrared image. The terminal 102 may recognize smoke or fire in the smoke or fire monitoring region based on the visible light image or recognize smoke or fire in the smoke or fire monitoring region based on the infrared image, or recognize smoke or fire in the smoke or fire monitoring region based on both the visible light image and the infrared image. In addition, the terminal 102 may further pre-process the to-be-recognized image when acquiring the to-be-recognized image. Specifically, the terminal 102 may acquire a monitoring image in the smoke or fire monitoring region. The monitoring image may be an image in the smoke or fire monitoring region captured by the camera device, including the visible light image or the infrared image. The two types of images may be captured by one camera device or captured by two camera devices respectively. The terminal 102 may further filter the monitoring image correspondingly according to an image type of the monitoring image to obtain a filtered monitoring image. For example, color-based filtering is performed on the visible light image, grayscale-value-based filtering is performed on the infrared image, and so on. Since the camera device may be a mobile camera device, a motion optical flow of the camera device is required to be eliminated. The terminal 102 may further acquire multiple frames of the monitoring image, filter each frame of the monitoring image, and eliminate a device motion optical flow in the filtered monitoring image according to multiple frames of the filtered monitoring image to obtain the to-be-recognized image. Specifically, the device motion optical flow in the monitoring image may be eliminated through a preset algorithm, so as to obtain the to-be-recognized image.

In step S204, a smoke or fire suspected region in the to-be-recognized image is recognized according to the to-be-recognized image, including: recognizing a smoke or fire suspected region in the visible light image based on colors, and recognizing a smoke or fire suspected region in the infrared image based on brightness.

The to-be-recognized image may be a to-be-recognized image acquired by the terminal 102 through a camera device and pre-processed. The terminal 102 may recognize the smoke or fire suspected region in the to-be-recognized image according to the to-be-recognized image, for example, according to a type of the to-be-recognized image. The smoke or fire suspected region may be a region where smoke or fire is suspected to have occurred. Specifically, if the to-be-recognized image is the visible light image, the terminal 102 may recognize the smoke or fire suspected region based on colors. For example, the smoke or fire suspected region is recognized based on a trichromatic (red, green and blue, RGB) system, which may also be referred to as a trichromatic color space. The RGB system includes a plurality of color values, which may specifically include red, green, and blue. That is, the color values may include the three colors. The smoke or fire suspected region may also be recognized based on YUV Y denotes a luminance value, U denotes a chrominance value, and V denotes a concentration value. The smoke or fire suspected region may also be recognized based on HSV H denotes a hue value, S denotes a saturation value, and V denotes a tone value. If the to-be-recognized image is the infrared image, since a temperature of a smoke or fire region is different from those of other regions, brightness at a smoke or fire position in the to-be-recognized image may also be different from surrounding brightness. The terminal 102 may recognize the smoke or fire suspected region in the to-be-recognized image based on brightness values in the to-be-recognized image.

In step S206, the to-be-recognized image including the smoke or fire suspected region is inputted into a preset model, and a smoke or fire state in the to-be-recognized image is recognized according to an output result of the preset model, the preset model being obtained by training based on the visible light image pre-marked with a smoke or fire state or the infrared image pre-marked with a smoke or fire state.

The preset model may be a model obtained by training and configured to recognize a smoke or fire state. Specifically, the preset model may be EfficientNet (compound model scaling method). EfficientNet may be a model scaling method. The terminal 102 may input the to-be-recognized image including the smoke or fire suspected region into the preset model. For example, the smoke or fire suspected region may be marked and then inputted into the preset model. The preset model may recognize the smoke or fire state based on the marked smoke or fire suspected region. A plurality of preset models may be provided, which may be trained respectively using the visible light image pre-marked with a smoke or fire state and the infrared image pre-marked with a smoke or fire state, so that the smoke or fire state can be recognized using different preset models based on different types of the to-be-recognized image.

In the above method for smoke or fire recognition, a to-be-recognized image including a visible light image and an infrared image in a fire monitoring region is acquired, a smoke or fire suspected region in the to-be-recognized image is recognized according to the to-be-recognized image, including: recognizing a smoke or fire suspected region in the visible light image based on colors, and recognizing a smoke or fire suspected region in the infrared image based on brightness, then the to-be-recognized image including the smoke or fire suspected region is inputted into a preset model, and a smoke or fire state in the to-be-recognized image is recognized according to an output result of the preset model obtained by training based on the visible light image pre-marked with a smoke or fire state or the infrared image pre-marked with a smoke or fire state. Compared with a conventional manner for detecting smoke or fire based on heat detection or smoke detection, in the solution, the smoke or fire region in the visible light image or the infrared image is recognized by the preset model, so as to achieve an effect of improving timeliness of smoke or fire recognition.

In one embodiment, the filtering the monitoring image correspondingly according to the image type of the monitoring image to obtain the filtered monitoring image includes: acquiring, if the monitoring image is the visible light image, color values of pixels in the visible light image in color channels of a trichromatic color space; acquiring a ratio of each color value to a sum of all the color values; acquiring products of the color value having a maximum ratio and the ratios as normalized color values corresponding to the color values; determining hue values, saturation values, and tone values corresponding to the pixels according to a maximum value and a minimum value of the normalized color values and the color values corresponding to the pixels; obtaining luminance values, chrominance values, and concentration values corresponding to the pixels according to the normalized color values and a preset brightness-chrominance transformation matrix; and obtaining the filtered monitoring image according to the color values, the hue values, the saturation values, the tone values, the luminance values, the chrominance values, and the concentration values corresponding to the pixels in the monitoring image.

In this embodiment, the monitoring image may be an image in the smoke or fire monitoring region acquired by the camera device connected to the terminal 102. The terminal 102 may filter the monitoring image. The monitoring image may include a plurality of types. If the monitoring image is the visible light image, since visible light images with different illumination intensity may have certain influence on a detection effect of the algorithm, in order to reduce the influence of illumination on the effect of the algorithm, colors in the RGB color space of the image are required to be normalized. The terminal 102 may acquire color values of pixels in the visible light image in color channels of the RGB color space, and may further acquire a ratio of each color value to a sum of all the color values to obtain the color value having a maximum ratio. The terminal 102 may multiply the color value having a maximum ratio by the ratios to obtain normalized color values corresponding to the color values. Specifically, the terminal 102 may first calculate ratios of component values of R, G, B channels to a sum of the component values of the R, G, B channels, and then multiply the ratios by possible maximum values of the R, G, B channels as values of normalized image pixels (r, g, b). Corresponding calculation formulas are shown as follows:

$$r = \frac{R}{R+G+B}, b = \frac{G}{R+G+B} \text{ and } b = \frac{G}{R+G+B},$$

where R, G, and B respectively represent component values of a pixel of an original image on R, G, B channels in the RGB color space, and r, g, and b are values of pixels of the image after normalized preprocessing.

The terminal 102 may further determine hue values, saturation values, and tone values corresponding to the pixels in the visible light image after the colors in the visible light image are normalized. The terminal 102 may determine hue values, saturation values, and tone values corresponding to the pixels in an HSV color space according to a maximum value and a minimum value of the normalized color values and the color values corresponding to the pixels in the visible light image, where H denotes a hue value, S denotes a saturation value, and V denotes a tone value, and may further obtain luminance values, chrominance values, and concentration values corresponding to the pixels in a YUV color space according to the normalized color values and a preset brightness-chrominance transformation matrix. Specifically, the terminal 102 may perform color space transformation on the visible light image after normalized preprocessing with a transformation method for the RGB color space, the HSV color space, and the YUV color space. The terminal 102 may construct corresponding color space components according to a transformation relationship among the RGB color space, the HSV color space, and the YUV color space. Corresponding calculation formulas are shown as follows:

$$H = \begin{cases} 0°, & \text{if max = min} \\ 60° \times \frac{G-B}{\max - \min} + 0°, & \text{if max = R and } G \geq B \\ 60° \times \frac{G-B}{\max - \min} + 360°, & \text{if max = R and } G \geq B \\ 60° \times \frac{B-R}{\max - \min} + 120°, & \text{if max = G} \\ 60° \times \frac{R-G}{\max - \min} + 240°, & \text{if max = B} \end{cases}$$

$$S = \begin{cases} 0, & \text{if max = 0} \\ \frac{\max - \min}{\max} = 1 - \frac{\min}{\max}, & \text{otherwise} \end{cases}$$

$$V = \max, \text{ and}$$

$$\begin{bmatrix} Y \\ U \\ V \end{bmatrix} = \begin{bmatrix} 0.299 & 0.578 & 0.114 \\ -0.168 & -0.3314 & 0.5 \\ -0.5 & -0.4187 & -0.0813 \end{bmatrix} \begin{bmatrix} R \\ G \\ B \end{bmatrix},$$

where H, S, and V respectively represent values on H (hue), S (saturation), and V (tone) components in the HSV color space, Y, U, and V respectively represent values on Y (luminance), U (chrominance), and V (concentration) components in the YUV color space, R, G, and B respectively represent coordinate values on R, G, and B components in the RGB color space, and max and min respectively represent the maximum value and the minimum value in R, G, and B.

The terminal 102 may perform the above normalization and color space transformation processing on the pixels in the monitoring image of the visible light image, that is, perform color normalization on the monitoring image based on the color values, transform the visible light image in terms of the HSV color space based on the hue values, the saturation values, and the tone values, and transform the visible light image in terms of the YUV color space based on the luminance values, the chrominance values, and the concentration values, so as to obtain the filtered monitoring image.

Through the embodiment, the terminal 102 may perform color normalization and color space conversion on the monitoring image of the visible light image, so that the terminal 102 can recognize smoke or fire based on the filtered monitoring image, thereby improving timeliness of smoke or fire recognition.

In one embodiment, the filtering the monitoring image correspondingly according to the image type of the monitoring image to obtain the filtered monitoring image includes: sorting, if the monitoring image is an infrared image, all pixels in a neighborhood of each pixel in the infrared image, acquiring an intermediate grayscale value in the sorted pixels, and assigning the intermediate grayscale value to the corresponding pixel to obtain the filtered monitoring image.

In this embodiment, the monitoring image may be an infrared image. The infrared image may be an infrared monitoring image captured by the camera device. If the monitoring image is an infrared image, the terminal 102, when filtering the infrared image, may sort all pixels in a neighborhood of each pixel in the infrared image, for example, in ascending order, acquire an intermediate grayscale value in the sorted pixels, and assign the intermediate grayscale value to the corresponding pixel to obtain the filtered monitoring image. Specifically, during collection and transmission of the infrared image, due to limitations of hardware conditions and shooting scenarios, collected experimental data may be interfered to some extent, which may include certain noise. Such noise may affect an effect of subsequent processing. Therefore, prior to analysis of the infrared image, the infrared image is required to be filtered. The terminal 102 may sort (in ascending order) all pixels in a neighborhood of a current pixel, and assign an intermediate grayscale value to the pixel. Generally, scanning is performed using a window with an odd number of points, the intermediate grayscale value is assigned to a pixel in the middle of the window, and median filtering is completed until all the image pixels are scanned. However, if an even number of points are provided, an average value of two middle elements is taken as a median. A calculation formula may be shown as follows:

$g(m,n) = \text{Median}\{f(m-k, n-l), (k,l) \in W\}$, where m and n respectively denote abscissa and ordinate corresponding to the pixel in the infrared image.

Through the embodiment, the terminal 102 may filter the infrared monitoring image based on the grayscale values, so that the terminal 102 can recognize smoke or fire based on the filtered monitoring image, thereby improving timeliness of smoke or fire recognition.

In one embodiment, the eliminating the device motion optical flow in the filtered monitoring image according to the multiple frames of the filtered monitoring image to obtain the to-be-recognized image includes: obtaining a projection transformation matrix corresponding to the filtered monitoring image according to a filtered monitoring image at a current moment and a filtered monitoring image at a next moment corresponding to the current moment; and obtaining, according to an inverse of the projection transformation matrix and the filtered monitoring image corresponding to the current moment, a filtered monitoring image after elimination of the device motion optical flow as the to-be-recognized image.

In this embodiment, after the terminal 102 filters the monitoring image, since the camera device such as a visible light camera or a mobile camera that collects image data is moving, many trajectories are present on the background, and recognition of motion trajectories of a target is also greatly affected by the motion of the camera. Such information is irrelevant to a to-be-recognized target and belongs to interference information. The terminal 102 is required to recognize and eliminate such trajectories. In fact, the motion of the trajectory is also calculated by calculating optical flow information, so there is a need to estimate the motion of the camera to eliminate the device motion optical flow, that is, the optical flow in a background region. The terminal 102 may eliminate the device motion optical flow according to multiple frames of the monitoring image. The terminal 102 may obtain a projection transformation matrix corresponding to the filtered monitoring image according to a filtered monitoring image at a current moment and a filtered monitoring image at a next moment corresponding to the current moment, and eliminate the device motion optical flow based on inverse of the projection transformation matrix and the filtered monitoring image corresponding to the current moment, for example, through a preset elimination algorithm, to obtain a monitoring image after elimination of the device motion optical flow and filtering as the to-be-recognized image. Specifically, the terminal 102 may first estimate the motion of the camera device. Since a change between two adjacent images is relatively small, a relationship between the two adjacent images may be described by a projection transformation matrix. That is, a subsequent image is obtained by projection transformation of a previous image. Therefore, the problem of estimating the motion of the camera device becomes a problem of calculating the projection transformation matrix using previous and subsequent images. A calculation formula for the projection transformation matrix of adjacent frames is shown as follows:

$$I_{t+1} = H \times I_t,$$

where grayscale images at time t and time t+1 are $I_t$ and $I_{t+1}$ respectively, and the projection transformation matrix H is calculated using the two images.

The terminal 102 may use the projection transformation matrix to eliminate the device motion optical flow after obtaining the projection transformation matrix. Specifically, the terminal 102 may wrap $I_{t+1}$ by using inverse of the obtained projection transformation matrix H. A specific calculation formula is shown as follows:

$$I_{t+1}^{warp} = H^{-1} \times I_{t+1},$$

where $I_{t+1}^{warp}$ represents an image at time t+1 on the assumption that no camera device moves, and $H^{-1}$ denotes the inverse of the projection transformation matrix H.

The terminal 102 may use a Total Variation L1 (TVL1) algorithm to calculate optimized optical flows of $I_t$ and $I_{t+1}^{warp}$ as to-be-recognized images at various moments.

Through this embodiment, the terminal 102 may eliminate the device motion optical flow based on the projection transformation matrix and the TVL1 algorithm, so that the terminal 102 can recognize smoke or fire based on the image after elimination of the device motion optical flow, thereby improving timeliness of smoke or fire recognition.

In one embodiment, the recognizing a smoke or fire suspected region in the to-be-recognized image according to the to-be-recognized image includes: obtaining a minimum smoke region in the to-be-recognized image according to the brightness values, the chrominance values, the concentration values, the color values, a first maximum threshold, and a first minimum threshold corresponding to pixels in the to-be-recognized image if the to-be-recognized image is the visible light image; obtaining a first minimum flame region in the to-be-recognized image according to a first color threshold, a second color threshold, and the color values corresponding to the pixels in the to-be-recognized image; obtaining a second minimum flame region in the to-be-recognized image according to the hue values, the saturation values, and the tone values corresponding to the pixels in the to-be-recognized image; obtaining a third minimum flame region in the to-be-recognized image according to the luminance values, the chrominance values, the concentration values, a luminance threshold, a brightness threshold, and a chrominance threshold corresponding to the pixels in the to-be-recognized image; extracting an optical flow from an image sequence of a plurality of to-be-recognized images to obtain a motion region in the to-be-recognized image; and obtaining the smoke or fire suspected region in the to-be-recognized image according to the minimum smoke region, the first minimum flame region, the second minimum flame region, the third minimum flame region, and the motion region.

In this embodiment, the terminal 102 may recognize the smoke or fire suspected region in the to-be-recognized image according to a type of the to-be-recognized image. If the to-be-recognized image is the visible light image, the terminal 102 may obtain a minimum smoke region in the to-be-recognized image according to the brightness values, the chrominance values, the concentration values, the color values, a first maximum threshold, and a first minimum threshold corresponding to pixels in the to-be-recognized image. Specifically, in the visible light image, colors of smoke and flame have significant features compared with a surrounding environment. Moreover, the colors of smoke and flame in an actual scenario are affected by many environmental factors, such as temperatures, combustion adequacy of combustion materials, and combustion materials, so that smoke and flame have special color distribution rules. The color of the smoke generated in the early stage of the fire is mostly gray white or light blue, and as time goes on, the color may change from gray black to black, while the flame is mostly prominent and bright red and yellow in the video image. Therefore, the terminal 102 may use the color rule exhibited by the smoke to filter the image. A difference between U and V components in the YUV color space of the smoke region is much larger than that in other non-smoke regions, and a pixel value range in the non-smoke regions is compressed, so the terminal 102 can use a pixel color filtering rule in the YUV color space to filter a smoke image. The pixel color filtering rule is shown as follows:

$$I_{color}(x, y) = \begin{cases} I_{rgb}(x, y) & \text{if } T_{max} > |U(x, y) - V(x, y)| > T_{min} \\ 0 & \text{otherwise} \end{cases},$$

where U (x, y) and V (x, y) are values of a U component and a V component of a pixel at (x, y) in the YUV color space, $I_{rgb}$(x, y) is a pixel value of the pixel at (x, y) in the RGB color space, and $T_{max}$ and $T_{min}$ denote the first maximum threshold and the first minimum threshold respectively. In the present invention, $T_{min}$ may be 63, and $T_{max}$ may be 178. A minimum rectangular region in the region satisfying the rule of the this formula is denoted as R SMOKE-YUV, which is taken as the minimum smoke region.

The terminal 102 may further recognize flame regions in the to-be-recognized image of visible light according to a first color threshold and a second color threshold corresponding to the pixels in the to-be-recognized image and the color values of the pixels to obtain a first minimum flame region. The first minimum flame region may represent a flame region of the visible light image in the RGB color space. The terminal 102 may further obtain a second minimum flame region in the to-be-recognized image according to the hue values, the saturation values, and the tone values corresponding to the pixels in the to-be-recognized image. The second minimum flame region may represent a flame region of the visible light image in the HSV color space. The terminal 102 may further obtain a third minimum flame region in the to-be-recognized image according to the luminance values, the chrominance values, the concentration values, a luminance threshold, a brightness threshold, and a chrominance threshold corresponding to the pixels in the to-be-recognized image. The third minimum flame region may represent a flame region of the visible light image in the YUV color space.

Specifically, the terminal 102 may use the color rule exhibited by the flame to filter the image. According to color features of the flame, different color filtering ranges are set in the RGB, HSV, and YUV color spaces. Pixel values of the pixels not in the color ranges are set to 0, and values of the pixels in the ranges are kept unchanged. Flame images filtered in the color spaces are obtained in combination with filtering results in the color spaces. The filtering ranges in the RGB, HSV, and YUV color spaces are shown as follows:

$$\begin{cases} R \geq R_0 \\ R \geq B, G \geq B \\ |G-B| + |R-B| \geq T_0 \end{cases},$$

$$\begin{cases} 0.02 < H < 0.3 \\ 0.2 < S < 1.0 \\ 0.98 < V < 1.0 \end{cases},$$

$$\begin{cases} Y \geq 80, Y > Y_{mean} \\ |U-128| \leq 60, V > V_{mean} \\ |V-128| \leq 40, U < U_{mean} \end{cases}$$

where $R_0$ denotes a threshold of a pixel R component, that is, the first color threshold, which is set to 135; $T_0$ denotes a threshold of |G−B|+|R−B|, that is, the second color threshold, which is set to 20; RGB color feature detection is performed in the smoke suspected region, and a minimum rectangular region satisfying the rule in the region is denoted as $R_{FIRE-RGB}$, that is, the first minimum flame region; H, S, and V respectively represent values on H (hue), S (saturation), and V (tone) components in the HSV color space, and a minimum rectangular region satisfying the rule in the region is denoted as $R_{FIRE-HSV}$, that is, the second minimum flame region; and Y, U, and V respectively represent values on Y (luminance), U (chrominance), and V (concentration) components in the YUV color space, $Y_{mean}$, $V_{mean}$ and $U_{mean}$ are thresholds determined by experiments, and a minimum rectangular region satisfying the rule in the region is denoted as $R_{FIRE-YUV}$, that is, the third minimum flame region.

Figure 3:
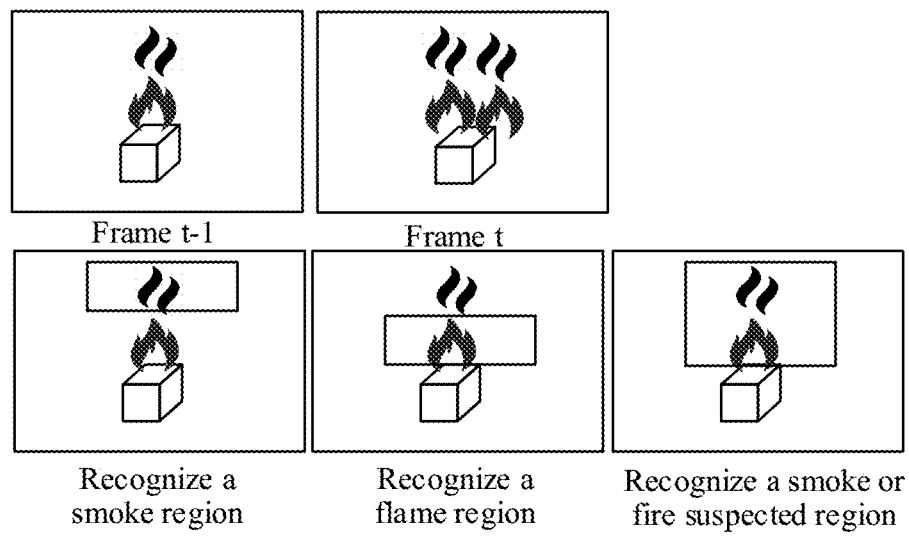
FIG. 3 is a schematic diagram illustrating a screen for a step of recognizing a smoke or fire suspected region in a visible light image according to an embodiment.

After obtaining the first minimum flame region, the second minimum flame region, and the third minimum flame region, the terminal 102 may combine the minimum smoke region with the minimum flame regions to obtain a pending smoke or fire suspected region in which a motion region is not calculated. As shown in FIG. 3, FIG. 3 is a schematic diagram illustrating a screen for a step of recognizing a smoke or fire suspected region in a visible light image according to an embodiment. The terminal 102 may combine the smoke suspected region $R_{SMOKE}$ obtained after color filtering with the minimum fire suspected regions $R_{FIRE}$ to obtain a smoke or fire suspected region $R_{Color}$ after color analysis. The suspected regions are calculated as follows:

$$R_{SMOKE} = R_{SMOKE-YUV},$$
$$R_{FIRE} = R_{FIRE-RGB} \cup R_{FIRE-HSV} \cup R_{FIRE-YUV},$$
$$R_{Color} = R_{SMOKE} \cup R_{FIRE},$$

where $R_{SMOKE}$ represents the smoke suspected region after color analysis, that is, the minimum smoke region, $R_{FIRE}$ represents the fire suspected region after color analysis, and $R_{Color}$ represents a pending smoke or fire suspected region after color analysis obtained by combination.

Figure 4:
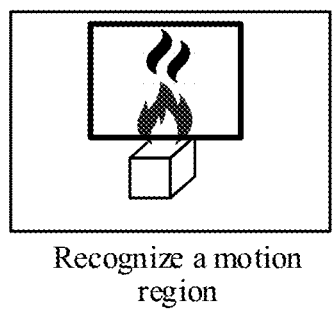
FIG. 4 is a schematic diagram illustrating a screen for a step of recognizing a motion region in the visible light image according to an embodiment.

The terminal 102 may further recognize a motion region in the visible light image. As shown in FIG. 4, FIG. 4 is a schematic diagram illustrating a screen for a step of recognizing a motion region in the visible light image according to an embodiment. The terminal 102 may recognize the motion region in the to-be-recognized image according to multiple frames of the to-be-recognized image. When a camera captures an image, two or several adjacent frames are very similar in background. If a moving foreground target exists, pixels at same positions in the two adjacent frames may vary. On the premise of ignoring noise interference, the motion of the target is a main factor causing changes in corresponding pixel values of the two frames. Therefore, the terminal 102 may recognize the motion region based on an optical flow method. The optical flow is an instantaneous velocity of pixel motion of a moving object in space in an observing and imaging plane. The optical flow method is a method in which a corresponding relationship between a previous frame and a current frame can be found according to changes in the pixels in the image sequence in a time domain and correlation between adjacent frames, so as to calculate motion information of an object between the adjacent frames. In the field of computer vision, the optical flow refers to motion of each pixel in a video image over time. Specifically, the terminal 102 may use the TV-L1 algorithm to extract an optical flow from the image sequence of the to-be-recognized image after elimination of the device motion optical flow, and obtain a motion region $R_{Action}$ of the corresponding image according to the extracted optical flow.

The terminal 102 may further obtain the smoke or fire suspected region in the to-be-recognized image according to the smoke region, the flame regions, and the motion region after recognizing the motion region. Specifically, the terminal 102 may integrate the smoke region, the flame regions, and the motion region, that is, integrate a color analysis result region and a motion region obtained from a same image, to obtain a smoke or fire suspected region of the visible light image. A calculation formula may be shown as follows:

$$R_A = R_{Color} \cup R_{Action},$$

where $R_A$ represents a region after the color analysis result region and the motion region are integrated, $R_{Color}$ represents the smoke or fire suspected region obtained after color analysis, and $R_{Action}$ represents the motion region of the image.

Through this embodiment, the terminal 102 may recognize the smoke region and the flame regions in the visible light image based on multiple color spaces, and may recognize the motion region based on a preset algorithm, so as to obtain the smoke or fire suspected region in the visible light image, which improves timeliness of smoke or fire recognition.

In one embodiment, the recognizing the smoke or fire suspected region in the to-be-recognized image according to the to-be-recognized image includes: obtaining a flame region in the to-be-recognized image according to a preset infrared brightness threshold if the to-be-recognized image is the infrared image; obtaining a pixel difference corresponding to the to-be-recognized image according to a to-be-recognized image at a current moment and a to-be-recognized image at a next moment corresponding to the current moment; determining a motion region in the to-be-recognized image according to the pixel difference and a preset motion image threshold; and obtaining the smoke or fire suspected region in the to-be-recognized image according to the flame region and the motion region.

Figure 5:
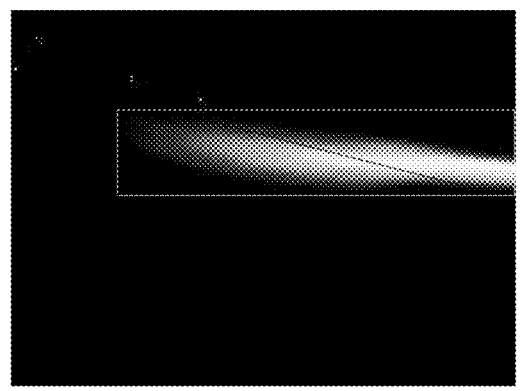
FIG. 5 is a schematic diagram illustrating a screen for a step of recognizing a smoke or fire suspected region in an infrared image according to an embodiment.

In this embodiment, the to-be-recognized image may also be an infrared image. The terminal 102 may further recognize a smoke or fire suspected region in the infrared image. As shown in FIG. 5, FIG. 5 is a schematic diagram illustrating a screen for a step of recognizing a smoke or fire suspected region in an infrared image according to an embodiment. The terminal 102 may obtain a flame region in the infrared image according to a preset infrared brightness threshold corresponding to the infrared image. Specifically, a large amount of energy produced by material combustion radiates around in the form of electromagnetic waves. The electromagnetic waves mainly include infrared bands dominated by heat radiation and visible light bands dominated by light radiation. Therefore, in a flame video image collected by an infrared camera, brightness of the flame region is significantly higher than that of other regions. Therefore, the terminal 102 may detect a suspected region by using high-temperature and highlighted features of the flame, and obtain a fire suspected region of the infrared image. A minimum rectangular region satisfying the region is $r_{fire}$.

Figure 6:
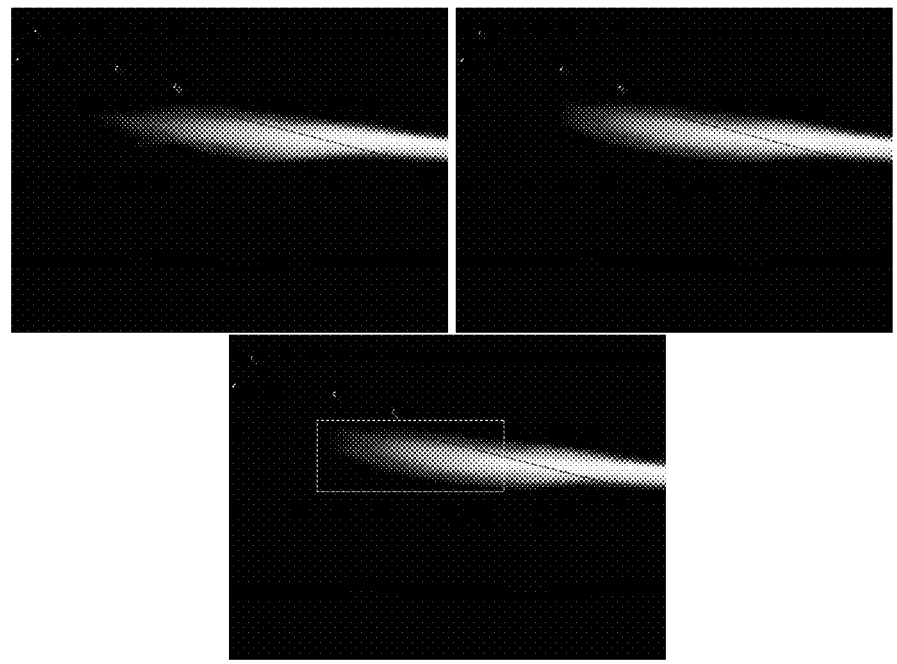
FIG. 6 is a schematic diagram illustrating a screen for a step of recognizing a motion region in the visible light image according to an embodiment.

The terminal 102 may further detect a motion region in the infrared image. As shown in FIG. 6, FIG. 6 is a schematic diagram illustrating a screen for a step of recognizing a motion region in the visible light image according to an embodiment. The terminal 102 may obtain a pixel difference corresponding to the to-be-recognized image according to a to-be-recognized image at a current moment and a to-be-recognized image at a next moment, and determine a motion region in the to-be-recognized image according to the pixel difference and a preset motion image threshold. Specifically, the terminal 102 may use a previous image of the current image as background to calculate a difference. A calculation formula thereof is shown as follows:

$$\Delta f_i = |f_i(x,y) - f_{i-1}(x,y)|,$$

where $f_i$ and $f_{i-1}$ respectively denote a current infrared image and a previous infrared image, and $\Delta f_i$ denotes an $i^{th}$ differential image, that is, a difference between the two infrared images. A difference between values of all corresponding pixels of the two infrared images is taken as a pixel thereof, and an absolute value is taken as the pixel difference.

The terminal 102 may select a preset motion image threshold to extract a motion region in the differential image. A calculation formula thereof may be shown as follows:

$$M_i(x, y) = \begin{cases} f_i(x, y) & \Delta f_i \geq T \\ 0, & \Delta f_i < T \end{cases},$$

where $M_i(x, y)$ is the extracted motion image, and T is the preset motion image threshold. A specific meaning of the equation is that when a difference value at a position of coordinate (x, y) of a pixel in the image is greater than or equal to the threshold, the value of the pixel in the motion image is the pixel value of the pixel in the original differential image, that is, a foreground pixel. Otherwise, the value is 0. The value of T may be 40. After obtaining the motion image, the terminal 102 may obtain the motion region according to the image, that is, the minimum rectangular region $r_{action}$ satisfying the rule, i.e., the minimum rectangular region including pixel values that are not 0.

After obtaining the flame region and the motion region in the infrared image, the terminal 102 may integrate the flame region and the motion region to obtain the smoke or fire suspected region in the infrared image. Specifically, the terminal 102 may integrate a fire suspected region and the motion region obtained from a same infrared image to obtain a smoke or fire suspected region $r_a$ in the infrared image. A specific formula may be shown as follows:

$$r_a = r_{fire} \cup r_{action},$$

where $r_a$ represents a region after the flame region and the motion region of the infrared image are integrated, that is, the smoke or fire suspected region, $r_{fire}$ represents a fire suspected region obtained after brightness analysis, and $r_{action}$ represents the motion region of the infrared image. The region is a minimum rectangular region satisfying the rule.

Through this embodiment, the terminal 102 may recognize the flame region in the infrared image based on brightness and recognize the motion region based on a differential image, so as to obtain the smoke or fire suspected region in the infrared image, which improves timeliness of smoke or fire recognition.

In one embodiment, the inputting the to-be-recognized image including the smoke or fire suspected region into a preset model, and recognizing a smoke or fire state in the to-be-recognized image according to an output result of the preset model includes: inputting the to-be-recognized image into the first preset model if the to-be-recognized image is the visible light image; inputting the to-be-recognized image into the second preset model if the to-be-recognized image is the infrared image; acquiring a judgment vector obtained after feature extraction on the smoke or fire suspected region through the first preset model and/or the second preset model; and determining the smoke or fire state in the to-be-recognized image according to the judgment vector.

In this embodiment, the preset model includes: a first preset model and a second preset model. The terminal 102 may use different preset models according to different types of the to-be-recognized image. The terminal 102 may further assign weights to the pixels in the to-be-recognized image through an attention mechanism prior to inputting the to-be-recognized image including the smoke or fire suspected region into the preset model. Specifically, the terminal 102 may obtain, according to the smoke or fire suspected region, a key region inputted to the preset model, which may specifically be a feature extraction network. A specific calculation formula may be shown as follows:

$$I_{i-attention} = w_i I_i,$$

where $I_{i-attention}$ denotes a value of a pixel i after passing through the attention mechanism, $I_i$ represents a value of the pixel i in the original image, and $w_i$ represents a weighting parameter (if the pixel i belongs to the smoke or fire suspected region of the image, $w_i=1.5$; otherwise, $w_i=1$). Thus, the terminal 102 may use the attention mechanism to pay attention to the key region of the image.

The terminal 102 may input the to-be-recognized image whose type is a visible light image into the first preset model, and the to-be-recognized image whose type is an infrared image into the second preset model. That is, the first preset model may be configured to recognize the visible light image, and the second preset model may be configured to recognize the infrared image. The terminal 102 may further train the model prior to inputting the to-be-recognized image into the preset model. Specifically, the preset model may be EfficientNet. The terminal 102 may train a first preset model E1 and a second preset model E2 (with a same network structure) of a network respectively by inputting visible light image data marked with a smoke or fire state and infrared image data marked with a smoke or fire state. Specific steps include: (1) pre-training the network on an ImageNet challenge data set; (2) using visible light smoke and flame image data to train E1 of the network, and using infrared smoke and flame image data to train E2 of the network, stochastic gradient descent being adopted during model training; and (3) adjusting parameters to fine-tune the network to obtain trained network models E1 and E2 as the first preset model and the second preset model.

The terminal 102 may acquire a judgment vector after feature extraction on the smoke or fire suspected region through the first preset model and the second preset model, and determine the smoke or fire state in the to-be-recognized image according to the judgment vector. Specifically, the terminal 102 may set a number of hidden units in a final fully connected layer of EfficientNet to a total number of corresponding classification results, which may be, for example, 4, representing 4 categories: no smoke and no fire, fire, fire and no smoke, and smoke and no fire. The terminal 102 may extract a judgment vector of 1*4 by feature extraction, and compare values in the vector to take the category corresponding to the maximum value as a recognition result. For example, a visible light image including flame and a visible light image including smoke or fire are respectively inputted to the preset model, and results obtained after the images pass through the final fully connected layer are $$\begin{bmatrix} 0.107 \\ 0.366 \\ 0.463 \\ 0.064 \end{bmatrix}$$

and $$\begin{bmatrix} 0.075 \\ 0.429 \\ 0.273 \\ 0.223 \end{bmatrix}$$

respectively, so as to obtain and input the state of "fire and no smoke" and the state of "smoke and fire" respectively according to the preset data categories $$\begin{bmatrix} \text{no smoke and no fire} \\ \text{smoke and fire} \\ \text{fire and no smoke} \\ \text{smoke and no fire} \end{bmatrix}.$$

Through this embodiment, the terminal 102 may recognize the smoke or fire state in the smoke or fire suspected region in the to-be-recognized image according to the preset model, so as to improve timeliness of smoke or fire recognition.

In one embodiment, subsequent to the recognizing the smoke or fire state in the to-be-recognized image according to the output result of the preset model, the method further includes: triggering, if the smoke or fire state is smoke or fire, alarm information, and inputting the to-be-recognized image into a smoke or fire detection model to acquire a smoke or fire region prediction box outputted by the smoke or fire detection model; the smoke or fire detection model being obtained by training based on a plurality of images with smoke or fire; and continuously recognizing the smoke or fire region prediction box according to a preset discriminant tracking algorithm, in order to track the smoke and smoke or fire state in the to-be-recognized image; through the preset discriminant tracking algorithm, a smoke or fire region prediction box in the to-be-recognized image at a current moment being obtained based on a to-be-recognized image including a smoke or fire region prediction box at a previous moment corresponding to the current moment.

Figure 7:
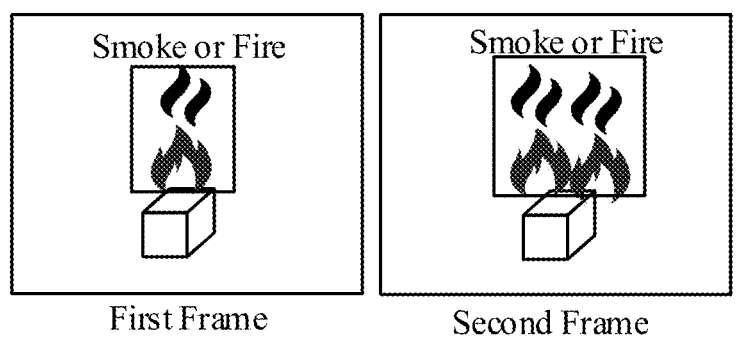
FIG. 7 is a schematic diagram illustrating a screen for a step of tracking smoke or fire according to an embodiment.

In this embodiment, the terminal 102 may perform different steps according to different smoke or fire states after recognizing the smoke or fire state in the to-be-recognized image. For example, if the smoke or fire state is smoke or fire, the terminal 102 may trigger alarm information and may track smoke or fire. As shown in FIG. 7, FIG. 7 is a schematic interface diagram of a step of tracking smoke or fire according to an embodiment. The terminal 102 may input the to-be-recognized image of which the smoke or fire state is recognized into a smoke or fire detection model to obtain a smoke or fire region prediction box outputted by the smoke or fire detection model. The smoke or fire detection model may be obtained by training based on a plurality of images with smoke or fire, which adopts a network structure the same as a yolov2 network structure. Specifically, the terminal 102 may input a first image after alarm into the smoke or fire detection model, calculate a feature vector of the image through the network, and correct the box with a regression method to obtain a smoke or fire region prediction box of the first image.

The terminal 102 may further continuously recognize the smoke or fire region prediction box according to a preset discriminant tracking algorithm to obtain a plurality of prediction boxes at different moments so as to track the smoke or fire state in the to-be-recognized image. Through the preset discriminant tracking algorithm, a smoke or fire region prediction box in the to-be-recognized image at a current moment may be obtained based on a to-be-recognized image including a smoke or fire region prediction box at a previous moment corresponding to the current moment. Specifically, the terminal 102 may track the smoke or fire region by using a KCF algorithm in the discriminant tracking algorithm. Specifically, in a frame $I_t$, a regressor is trained by sampling near a position $P_t$ of a target. The regressor can calculate responses for a small window. In a frame $I_{t+1}$, a response value of each sampling window is judged by sampling near a position $P_t$ of a previous frame by using the regressor, and the sampling with the maximum response value is taken as a position $P_{t+1}$ of the target in the frame. Specifically, a principle of the KCF algorithm is to train an object detection model during the tracking, use the required object detection model to detect a position of a next video image to predict whether the position is a required target, and then use a new detection result to update a training set, so as to update the object detection model. By Fourier transform and ridge regression in a frequency domain, a target region is taken as a positive sample, and a surrounding region not including the target is taken as a negative sample. A cyclic matrix of the selected target region and surrounding region is cyclically shifted horizontally and vertically to generate a large number of samples, so as to achieve the training of the target detection model.

Through this embodiment, the terminal 102 may continuously track the smoke or fire state by using the preset smoke or fire detection model after recognizing the smoke or fire, so as to grasp a motion state and spreading situation of the fire in time, thereby improving timeliness of smoke or fire recognition.

Figure 8:
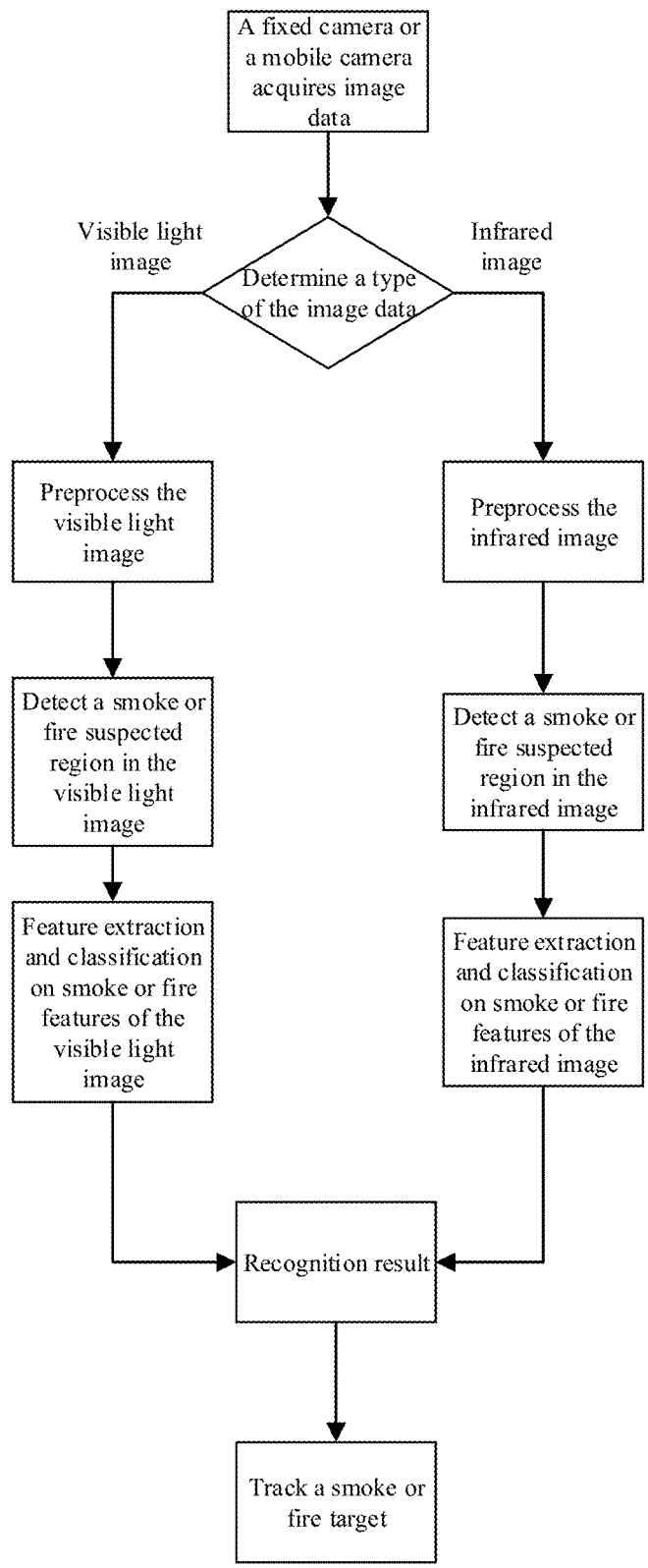
FIG. 8 is a schematic flow diagram illustrating the method for smoke or fire recognition according to another embodiment.

In one embodiment, as shown in FIG. 8, FIG. 8 is a schematic flow diagram illustrating the method for smoke or fire recognition according to another embodiment. The terminal 102 may acquire a monitoring image by a camera device, such as a fixed camera or a mobile camera, and perform corresponding processing according to an acquired image type. Specifically, if the monitoring image is the visible light image, the visible light image is pre-processed, i.e., filtered, a smoke or fire suspected region in the visible light image is detected, and feature extraction and classification may be further performed on a smoke or fire state in the visible light image. If the monitoring image is an infrared image, the infrared image is pre-processed, i.e., filtered, a smoke or fire suspected region in the infrared image is detected, and feature extraction and classification may be further performed on a smoke or fire state in the infrared image. Finally, a recognition result is obtained. The recognition result may include a recognition result for the visible light image or a recognition result for the infrared image, or recognition results for the visible light image and the infrared image. After obtaining the recognition result, the terminal 102 may track the smoke or fire state, for example, by using the smoke or fire detection model and a discriminant tracking algorithm.

Through this embodiment, the terminal 102 may recognize a smoke or fire region in the visible light image or infrared image through the preset model, and may perform continuous tracking, so as to achieve an effect of improving timeliness of smoke or fire recognition.

It should be understood that, although the steps in the flow diagrams of FIG. 2 and FIG. 8 are displayed in sequence as indicated by the arrows, the steps are not necessarily performed in the order indicated by the arrows. Unless otherwise clearly specified herein, the steps are performed without any strict sequence limitation, and may be performed in other orders. In addition, at least some steps in FIG. 2 and FIG. 8 may include a plurality of steps or a plurality of stages, and such steps or stages are not necessarily performed at a same moment, and may be performed at different moments. The steps or stages are not necessarily performed in sequence, and may be performed in turn or alternately with other steps or at least some of steps or stages in the other steps.

Figure 9:
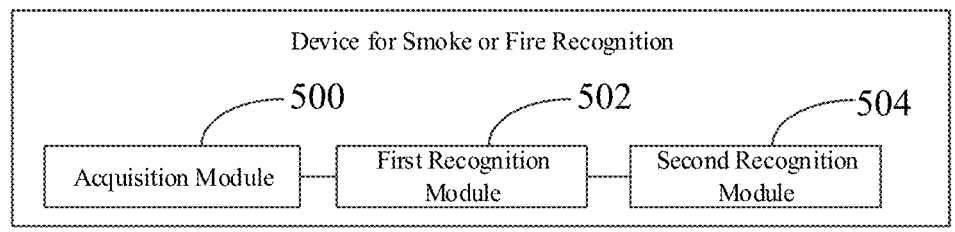
FIG. 9 is a block diagram illustrating a configuration of a device for smoke or fire recognition according to an embodiment.

In one embodiment, as shown in FIG. 9, a device for smoke or fire recognition is provided, including: an acquisition module 500, a first recognition module 502, and a second recognition module 504.

The acquisition module 500 is configured to acquire a to-be-recognized image in a smoke or fire monitoring region, the to-be-recognized image including a visible light image and/or an infrared image.

The first recognition module 502 is configured to recognize a smoke or fire suspected region in the to-be-recognized image according to the to-be-recognized image, including: recognizing a smoke or fire suspected region in the visible light image based on colors, and recognizing a smoke or fire suspected region in the infrared image based on brightness.

The second recognition module 504 is configured to input the to-be-recognized image including the smoke or fire suspected region into a preset model, and recognize a smoke or fire state in the to-be-recognized image according to an output result of the preset model, the preset model being obtained by training based on the visible light image pre-marked with a smoke or fire state or the infrared image pre-marked with a smoke or fire state.

In one embodiment, the acquisition module 500 is specifically configured to acquire a monitoring image in the smoke or fire monitoring region; filter the monitoring image correspondingly according to an image type of the monitoring image to obtain a filtered monitoring image; and eliminate a device motion optical flow in the filtered monitoring image according to multiple frames of the filtered monitoring image to obtain the to-be-recognized image.

In one embodiment, the acquisition module 500 is specifically configured to acquire, if the monitoring image is the visible light image, color values of pixels in the visible light image in color channels of a trichromatic color space; acquire a ratio of each color value to a sum of all the color values; acquire products of the color value having a maximum ratio and the ratios as normalized color values corresponding to the color values; determine hue values, saturation values, and tone values corresponding to the pixels according to a maximum value and a minimum value of the normalized color values and the color values corresponding to the pixels; obtain luminance values, chrominance values, and concentration values corresponding to the pixels according to the normalized color values and a preset brightness-chrominance transformation matrix; and obtain the filtered monitoring image according to the color values, the hue values, the saturation values, the tone values, the luminance values, the chrominance values, and the concentration values corresponding to the pixels in the monitoring image.

In one embodiment, the acquisition module 500 is specifically configured to sort, if the monitoring image is an infrared image, all pixels in a neighborhood of each pixel in the infrared image, acquire an intermediate grayscale value in the sorted pixels, and assign the intermediate grayscale value to the corresponding pixel to obtain the filtered monitoring image.

In one embodiment, the acquisition module 500 is specifically configured to obtain a projection transformation matrix corresponding to the filtered monitoring image according to a filtered monitoring image at a current moment and a filtered monitoring image at a next moment corresponding to the current moment; and obtain, according to an inverse of the projection transformation matrix and the filtered monitoring image corresponding to the current moment, a filtered monitoring image after elimination of the device motion optical flow as the to-be-recognized image.

In one embodiment, the first recognition module 502 is specifically configured to obtain a minimum smoke region in the to-be-recognized image according to the brightness values, the chrominance values, the concentration values, the color values, a first maximum threshold, and a first minimum threshold corresponding to pixels in the to-be-recognized image if the to-be-recognized image is the visible light image; obtain a first minimum flame region in the to-be-recognized image according to a first color threshold, a second color threshold, and the color values corresponding to the pixels in the to-be-recognized image; obtain a second minimum flame region in the to-be-recognized image according to the hue values, the saturation values, and the tone values corresponding to the pixels in the to-be-recognized image; obtain a third minimum flame region in the to-be-recognized image according to the luminance values, the chrominance values, the concentration values, a luminance threshold, a brightness threshold, and a chrominance threshold corresponding to the pixels in the to-be-recognized image; extract an optical flow from an image sequence of a plurality of to-be-recognized images to obtain a motion region in the to-be-recognized image; and obtain the smoke or fire suspected region in the to-be-recognized image according to the minimum smoke region, the first minimum flame region, the second minimum flame region, the third minimum flame region, and the motion region.

In one embodiment, the first recognition module 502 is specifically configured to obtain a flame region in the to-be-recognized image according to a preset infrared brightness threshold if the to-be-recognized image is the infrared image; obtain a pixel difference corresponding to the to-be-recognized image according to a to-be-recognized image at a current moment and a to-be-recognized image at a next moment corresponding to the current moment; determining a motion region in the to-be-recognized image according to the pixel difference and a preset motion image threshold; and obtain the smoke or fire suspected region in the to-be-recognized image according to the flame region and the motion region.

In one embodiment, the second recognition module 504 is specifically configured to input the to-be-recognized image into the first preset model if the to-be-recognized image is the visible light image; input the to-be-recognized image into the second preset model if the to-be-recognized image is the infrared image; acquire a judgment vector obtained after feature extraction on the smoke or fire suspected region through the first preset model and/or the second preset model; and determine the smoke or fire state in the to-be-recognized image according to the judgment vector.

In one embodiment, the device further includes a tracking module configured to trigger, if the smoke or fire state is smoke or fire, alarm information, and input the to-be-recognized image into a smoke or fire detection model to acquire a smoke or fire region prediction box outputted by the smoke or fire detection model; the smoke or fire detection model being obtained by training based on a plurality of images with smoke or fire; and continuously recognize the smoke or fire region prediction box according to a preset discriminant tracking algorithm, in order to track the smoke and smoke or fire state in the to-be-recognized image; through the preset discriminant tracking algorithm, a smoke or fire region prediction box in the to-be-recognized image at a current moment being obtained based on a to-be-recognized image including a smoke or fire region prediction box at a previous moment corresponding to the current moment.

Specific limitations on the smoke or fire recognition apparatus may be obtained with reference to the limitations on the method for smoke or fire recognition hereinabove. Details are not described herein. The modules in the smoke or fire recognition apparatus may be implemented entirely or partially by software, hardware, or a combination thereof. The above modules may be built in or independent of a processor of a computer apparatus in a hardware form, or may be stored in a memory of the computer apparatus in a software form, so that the processor invokes and performs operations corresponding to the above modules.

In one embodiment, a computer apparatus is provided. The computer apparatus may be a terminal, and an internal configuration thereof may be shown in FIG. 10. The computer apparatus includes a processor, a memory, a network interface, a display screen, and an input device that are connected by a system bus. The processor of the computer apparatus is configured to provide computing and control capabilities. The memory of the computer apparatus includes a non-volatile storage medium and an internal memory. The non-volatile storage medium stores an operating system and a computer program. The internal memory provides an environment for running of the operating system and the computer program in the non-volatile storage medium. The communication interface of the computer apparatus is configured to communicate with an external terminal in a wired or wireless manner. The wireless manner may be implemented by Wi-Fi, a service provider network, near field communication (NFC), or other technologies. The computer program is executed by the processor to implement a method for smoke or fire recognition. The display screen of the computer apparatus may be a liquid crystal display screen or an electronic ink display screen. The input device of the computer apparatus may be a touchscreen covering the display screen, or may be a key, a trackball, or a touchpad disposed on a housing of the computer apparatus, or may be an external keyboard, a touchpad, a mouse, or the like.

Figure 10:
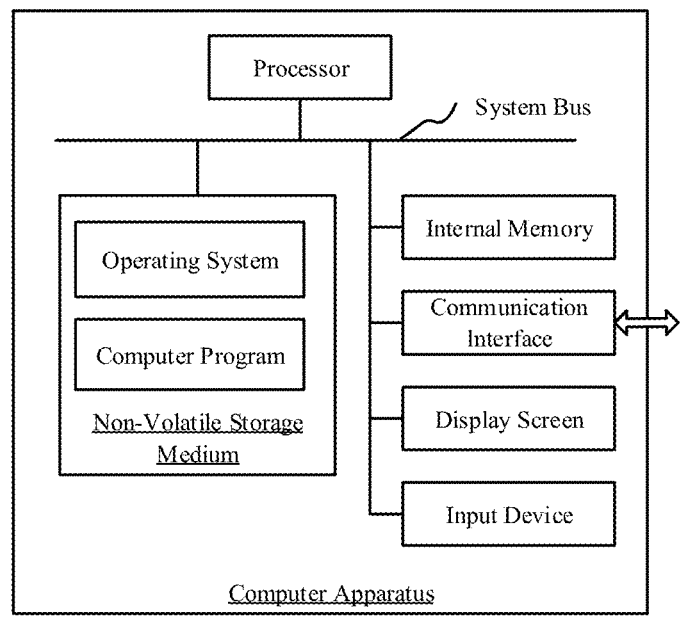
FIG. 10 is a schematic diagram illustrating an internal configuration of a computer apparatus according to an embodiment.

Those skilled in the art may understand that, in the configuration shown in FIG. 10, only a block diagram of a partial configuration related to the solution of the present disclosure is shown, which does not constitute a limitation on the computer apparatus to which the solution of the present disclosure is applied. Specifically, the computer apparatus may include more or fewer components than those shown in the figure, or some components may be combined, or a different component deployment may be used.

In one embodiment, a computer apparatus is provided, including a memory and a processor. The memory stores a computer program. The processor implements the method for smoke or fire recognition when executing the computer program.

In one embodiment, a computer-readable storage medium is provided, storing a computer program. The computer program, when executed by a processor, causes the processor to implement the method for smoke or fire recognition.

Those of ordinary skill in the art may understand that some or all procedures in the methods in the foregoing embodiments may be implemented by a computer program instructing related hardware, the computer program may be stored in a non-volatile computer-readable storage medium, and when the computer program is executed, the procedures in the foregoing method embodiments may be implemented. Any reference to the memory, storage, database, or other media used in the embodiments provided in the present disclosure may include at least one of a non-volatile memory and a volatile memory. The non-volatile memory may include a read-only memory (ROM), a magnetic tape, a floppy disk, a flash memory, an optical memory, or the like. The volatile memory may include a random access memory (RAM) or an external cache memory. By way of illustration instead of limitation, the RAM is available in a variety of forms, such as a static random access memory (SRAM), a dynamic random access memory (DRAM), or the like.

The technical features in the above embodiments may be randomly combined. For concise description, not all possible combinations of the technical features in the above embodiments are described. However, all the combinations of the technical features are to be considered as falling within the scope described in this specification provided that they do not conflict with each other.

The above embodiments only describe several implementations of the present disclosure, and their description is specific and detailed, but cannot therefore be understood as a limitation on the patent scope of the invention. It should be noted that those of ordinary skill in the art may further make variations and improvements without departing from the conception of the present disclosure, and these all fall within the protection scope of the present disclosure. Therefore, the patent protection scope of the present disclosure should be subject to the appended claims.

What is claimed is:

1. A method for smoke or fire recognition, the method comprising:

acquiring a visible light image obtained by imaging a smoke or fire monitoring region by a camera device;

acquiring color values of pixels in the visible light image in color channels of a trichromatic color space;

acquiring a ratio of each color value to a sum of all the color values;

acquiring products of the color value having a maximum ratio and the ratios as normalized color values corresponding to the color values;

determining hue values, saturation values, and tone values corresponding to the pixels according to a maximum value and a minimum value of the normalized color values and the color values corresponding to the pixels;

obtaining luminance values, chrominance values, and concentration values corresponding to the pixels according to the normalized color values and a preset brightness-chrominance transformation matrix;

obtaining a filtered visible light image according to the color values, the hue values, the saturation values, the tone values, the luminance values, the chrominance values, and the concentration values corresponding to the pixels in the visible light image;

eliminating a device motion optical flow in the filtered visible light image according to multiple frames of the filtered visible light images to obtain a to-be-recognized image;

obtaining a minimum smoke region in the to-be-recognized image according to the brightness values, the chrominance values, the concentration values, the color values, a first maximum threshold, and a first minimum threshold corresponding to pixels in the to-be-recognized image;

obtaining a first minimum flame region in the to-be-recognized image according to a first color threshold, a second color threshold, and the color values corresponding to the pixels in the to-be-recognized image;

obtaining a second minimum flame region in the to-be-recognized image according to the hue values, the saturation values, and the tone values corresponding to the pixels in the to-be-recognized image;

obtaining a third minimum flame region in the to-be-recognized image according to the luminance values, the chrominance values, the concentration values, a luminance threshold, a brightness threshold, and a chrominance threshold corresponding to the pixels in the to-be-recognized image;

extracting an optical flow from an image sequence of a plurality of to-be-recognized images to obtain a motion region in the to-be-recognized image;

recognizing a smoke or fire suspected region in the to-be-recognized image according to the minimum smoke region, the first minimum flame region, the second minimum flame region, the third minimum flame region, and the motion region; and inputting the to-be-recognized image comprising the smoke or fire suspected region into a preset model, and recognizing a smoke or fire state in the to-be-recognized image according to an output result of the preset model, the preset model being obtained by training based on the visible light image pre-marked with a smoke or fire state.

2. The method according to claim 1, wherein the eliminating the device motion optical flow in the filtered visible light image according to the multiple frames of the filtered visible light image to obtain the to-be-recognized image comprises:

obtaining a projection transformation matrix corresponding to the filtered visible light image according to a filtered visible light image at a current moment and a filtered visible light image at a next moment corresponding to the current moment; and obtaining, according to an inverse of the projection transformation matrix and the filtered visible light image corresponding to the current moment, a filtered visible light image after elimination of the device motion optical flow as the to-be-recognized image.

3. The method according to claim 1, wherein the inputting the to-be-recognized image comprising the smoke or fire suspected region into the preset model, and recognizing the smoke or fire state in the to-be-recognized image according to the output result of the preset model comprises:

inputting the to-be-recognized image into the preset model;

acquiring a judgment vector obtained after feature extraction on the smoke or fire suspected region through the preset model; and determining the smoke or fire state in the to-be-recognized image according to the judgment vector.

4. The method according to claim 1, subsequent to the recognizing the smoke or fire state in the to-be-recognized image according to the output result of the preset model, further comprising:

triggering, if the smoke or fire state is smoke or fire, alarm information, and inputting the to-be-recognized image into a smoke or fire detection model to acquire a smoke or fire region prediction box outputted by the smoke or fire detection model, the smoke or fire detection model being obtained by training based on a plurality of images with smoke or fire; and continuously recognizing the smoke or fire region prediction box according to a preset discriminant tracking algorithm, in order to track the smoke or fire state in the to-be-recognized image, a smoke or fire region prediction box in the to-be-recognized image at a current moment being obtained through the preset discriminant tracking algorithm based on a to-be-recognized image comprising a smoke or fire region prediction box at a previous moment corresponding to the current moment.

5. A computer apparatus, comprising a memory and a processor, the memory storing a computer program, wherein the computer program, when executed by the processor, causes the processor to:

acquire a visible light image obtained by imaging a smoke or fire monitoring region by a camera device;

acquire color values of pixels in the visible light image in color channels of a trichromatic color space;

acquire a ratio of each color value to a sum of all the color values;

acquire products of the color value having a maximum ratio and the ratios as normalized color values corresponding to the color values;

determine hue values, saturation values, and tone values corresponding to the pixels according to a maximum value and a minimum value of the normalized color values and the color values corresponding to the pixels;

obtain luminance values, chrominance values, and concentration values corresponding to the pixels according to the normalized color values and a preset brightness-chrominance transformation matrix;

obtain a filtered visible light image according to the color values, the hue values, the saturation values, the tone values, the luminance values, the chrominance values, and the concentration values corresponding to the pixels in the visible light image;

eliminate a device motion optical flow in the filtered visible light image according to multiple frames of the filtered visible light images to obtain a to-be-recognized image;

obtain a minimum smoke region in the to-be-recognized image according to the brightness values, the chrominance values, the concentration values, the color values, a first maximum threshold, and a first minimum threshold corresponding to pixels in the to-be-recognized image;

obtain a first minimum flame region in the to-be-recognized image according to a first color threshold, a second color threshold, and the color values corresponding to the pixels in the to-be-recognized image;

obtain a second minimum flame region in the to-be-recognized image according to the hue values, the saturation values, and the tone values corresponding to the pixels in the to-be-recognized image;

obtain a third minimum flame region in the to-be-recognized image according to the luminance values, the chrominance values, the concentration values, a luminance threshold, a brightness threshold, and a chrominance threshold corresponding to the pixels in the to-be-recognized image;

extract an optical flow from an image sequence of a plurality of to-be-recognized images to obtain a motion region in the to-be-recognized image;

recognize a smoke or fire suspected region in the to-be-recognized image according to the minimum smoke region, the first minimum flame region, the second minimum flame region, the third minimum flame region, and the motion region; and input the to-be-recognized image comprising the smoke or fire suspected region into a preset model, and recognizing a smoke or fire state in the to-be-recognized image according to an output result of the preset model, the preset model being obtained by training based on the visible light image pre-marked with a smoke or fire state.

6. A computer-readable non-volatile storage medium, storing a computer program, wherein the computer program, when executed by a processor, causes the processor to:

acquire a visible light image obtained by imaging a smoke or fire monitoring region by a camera device;

acquire color values of pixels in the visible light image in color channels of a trichromatic color space;

acquire a ratio of each color value to a sum of all the color values;

acquire products of the color value having a maximum ratio and the ratios as normalized color values corresponding to the color values;

determine hue values, saturation values, and tone values corresponding to the pixels according to a maximum value and a minimum value of the normalized color values and the color values corresponding to the pixels;

obtain luminance values, chrominance values, and concentration values corresponding to the pixels according to the normalized color values and a preset brightness-chrominance transformation matrix;

obtain a filtered visible light image according to the color values, the hue values, the saturation values, the tone values, the luminance values, the chrominance values, and the concentration values corresponding to the pixels in the visible light image;

eliminate a device motion optical flow in the filtered visible light image according to multiple frames of the filtered visible light images to obtain a to-be-recognized image;

obtain a minimum smoke region in the to-be-recognized image according to the brightness values, the chrominance values, the concentration values, the color values, a first maximum threshold, and a first minimum threshold corresponding to pixels in the to-be-recognized image;

obtain a first minimum flame region in the to-be-recognized image according to a first color threshold, a second color threshold, and the color values corresponding to the pixels in the to-be-recognized image;

obtain a second minimum flame region in the to-be-recognized image according to the hue values, the saturation values, and the tone values corresponding to the pixels in the to-be-recognized image;

obtain a third minimum flame region in the to-be-recognized image according to the luminance values, the chrominance values, the concentration values, a luminance threshold, a brightness threshold, and a chrominance threshold corresponding to the pixels in the to-be-recognized image;

extract an optical flow from an image sequence of a plurality of to-be-recognized images to obtain a motion region in the to-be-recognized image;

recognize a smoke or fire suspected region in the to-be-recognized image according to the minimum smoke region, the first minimum flame region, the second minimum flame region, the third minimum flame region, and the motion region; and input the to-be-recognized image comprising the smoke or fire suspected region into a preset model, and recognizing a smoke or fire state in the to-be-recognized image according to an output result of the preset model, the preset model being obtained by training based on the visible light image pre-marked with a smoke or fire state.

* * * * *